United States Patent
Cho et al.

(10) Patent No.: US 9,255,748 B2
(45) Date of Patent: Feb. 9, 2016

(54) HEAT EXCHANGER FOR VEHICLE

(71) Applicant: Hyundai Motor Company, Seoul (KR)

(72) Inventors: Wan Je Cho, Hwaseong-si (KR); Jae Yeon Kim, Hwaseong-si (KR)

(73) Assignees: HYUNDAI MOTOR COMPANY, Seoul (KR); KBAUTOTECH CO., LTD., Asan-Si (KR)

( * ) Notice: Subject to any disclaimer, the term of this patent is extended or adjusted under 35 U.S.C. 154(b) by 501 days.

(21) Appl. No.: 13/714,215

(22) Filed: Dec. 13, 2012

(65) Prior Publication Data

US 2014/0116648 A1   May 1, 2014

(30) Foreign Application Priority Data

Oct. 26, 2012   (KR) .................. 10-2012-0119947

(51) Int. Cl.
*F16K 7/06* (2006.01)
*F28F 27/02* (2006.01)
*F28D 9/00* (2006.01)
*F28D 21/00* (2006.01)
*F16H 57/04* (2010.01)

(52) U.S. Cl.
CPC .............. *F28F 27/02* (2013.01); *F28D 9/005* (2013.01); *F16H 57/0417* (2013.01); *F28D 2021/0089* (2013.01); *F28F 2250/06* (2013.01); *F28F 2280/06* (2013.01)

(58) Field of Classification Search
CPC ............ F28D 9/005; F28D 2021/0049; F28F 2250/06; F16K 5/0421; F16K 5/0429; F16K 7/06; F16K 7/061; F16K 7/063; F16K 7/065; F16K 7/066; F16K 7/068; F16K 11/0853; F16K 11/0856; G05D 23/02; G05D 23/021; G05D 23/022

USPC ...... 137/468; 165/103; 236/34.5, 93 A, 99 R, 236/99 J, 99 K; 251/11, 318
See application file for complete search history.

(56) References Cited

U.S. PATENT DOCUMENTS

| | | | | |
|---|---|---|---|---|
| 2,847,165 A | * | 8/1958 | Freismuth | 236/34.5 |
| 5,950,715 A | | 9/1999 | Jönsson et al. | |
| 5,961,037 A | * | 10/1999 | Fiedler et al. | 236/34.5 |

(Continued)

FOREIGN PATENT DOCUMENTS

| | | |
|---|---|---|
| EP | 1 404 995 B1 | 2/2006 |
| JP | 2001-508163 A | 6/2001 |
| KR | 100876063 B1 | 12/2008 |

(Continued)

*Primary Examiner* — Judy Swann
*Assistant Examiner* — John Higgins
(74) *Attorney, Agent, or Firm* — Morgan, Lewis & Bockius LLP

(57) ABSTRACT

A heat exchanger for a vehicle includes a heat radiating portion provided with first and second connecting lines formed by alternately stacking a plurality of plates and first and second operating fluids heat-exchanging with each other while passing through the first and second connecting lines; a bifurcating portion connecting an inflow hole for flowing one of the operating fluids with an exhaust hole for exhausting the one operating fluid, and adapted for the one operating fluid to bypass the heat radiating portion according to a temperature of the one operating fluid; and a valve unit mounted at the inflow hole forming the bifurcating portion and adapted to flow the operating fluid selectively to the heat radiating portion or the bifurcating portion according to a temperature of the one operating fluid flowing into the inflow hole.

18 Claims, 10 Drawing Sheets

(56) References Cited

U.S. PATENT DOCUMENTS

| | | |
|---|---|---|
| 6,962,295 B2 * | 11/2005 | Ieda .............................. 236/34.5 |
| 7,735,520 B2 | 6/2010 | Peric |
| 8,839,748 B2 * | 9/2014 | Kim et al. ................... 123/41.33 |
| 2003/0217707 A1 * | 11/2003 | Iwasaki ....................... 123/41.31 |
| 2008/0135633 A1 * | 6/2008 | Heldberg et al. ............. 236/34.5 |
| 2013/0160972 A1 | 6/2013 | Sheppard et al. |

FOREIGN PATENT DOCUMENTS

| | | |
|---|---|---|
| KR | 10-2010-0060638 A | 6/2010 |
| KR | 10-2012-0121159 A | 11/2012 |
| WO | WO 03/006857 A1 | 1/2003 |

* cited by examiner

HEAT EXCHANGER FOR VEHICLE

CROSS-REFERENCE TO RELATED APPLICATION

The present application claims priority of Korean Patent Application Number 10-2012-0119947 filed Oct. 26, 2012, the entire contents of which application is incorporated herein for all purposes by this reference.

BACKGROUND OF INVENTION

1. Field of Invention

The present invention relates to a heat exchanger for a vehicle. More particularly, the present invention relates to a heat exchanger for a vehicle which can control temperatures of operating fluids which flows in the heat exchanger.

2. Description of Related Art

Generally, a heat exchanger transfers heat from high-temperature fluid to low-temperature fluid through a heat transfer surface, and is used in a heater, a cooler, an evaporator, and a condenser.

Such a heat exchanger reuses heat energy or controls a temperature of an operating fluid flowing therein for demanded performance. The heat exchanger is applied to an air conditioning system or a transmission oil cooler of a vehicle, and is mounted at an engine compartment.

Since the heat exchanger is hard to be mounted at the engine compartment with restricted space, studies for the heat exchanger with smaller size, lighter weight, and higher efficiency have been developed.

A conventional heat exchanger controls the temperatures of the operating fluids according to a condition of a vehicle and supplies the operating fluids to an engine, a transmission, or an air conditioning system. For this purpose, bifurcation circuits and valves are mounted on each hydraulic line through which the operating fluids operated as heating medium or cooling medium passes. Therefore, constituent elements and assembling processes increase and layout complicated.

If additional bifurcation circuits and valves are not used, heat exchanging efficiency cannot be controlled according to flow amount of the operating fluid. Therefore, the temperature of the operating fluid cannot be controlled efficiently.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a heat exchanger for a vehicle having advantages of simultaneously warming up and cooling operating fluids according to temperatures or flow amounts of the operating fluids at a running state or an initial starting condition of the vehicle when the operating fluids are heat exchanged with each other in the heat exchanger.

Various aspects of the present invention have been made in an effort to provide a heat exchanger for a vehicle having further advantages of improving fuel economy and heating performance by controlling temperatures of operating fluids according to condition of the vehicle, and of reducing assembling processes by simplifying a structure of the heat exchanger.

Various aspects of the present invention provide for a heat exchanger for a vehicle that may include a heat radiating portion provided with a first connecting line and a second line formed alternately by stacking a plurality of plates, and receiving first and second operating fluids respectively into the first and second connecting lines, the first and second operating fluids heat-exchanging with each other during passing through the first and second connecting lines and the first and second operating fluids supplying into the first and second connecting lines not being mixed with each other and being circulated; a bifurcating portion connecting an inflow hole for flowing one operating fluid of the first and second operating fluids with an exhaust hole for exhausting the one operating fluid, and adapted for the one operating fluid to bypass the heat radiating portion according to a temperature of the one operating fluid; and a valve unit mounted at the inflow hole forming the bifurcating portion and adapted to flow the operating fluid selectively to the heat radiating portion or the bifurcating portion according to a temperature of the one operating fluid flowing into the inflow hole.

The first operating fluid may flow into the heat radiating portion through a first inflow hole and flow out from the heat radiating portion through a first exhaust hole, and the first inflow hole may be connected to the first exhaust hole through the first connecting line, the second operating fluid may flow into the heat radiating portion through a second inflow hole and flow out from the heat radiating portion through a second exhaust hole, and the second inflow hole may be connected to the second exhaust hole through the second connecting line, the first and second inflow holes may be formed at both sides of a surface of the heat radiating portion along a length direction, and the first and second exhaust holes may be distanced from the first and second inflow holes and formed at the both sides of the surface of the heat radiating portion along the length direction.

The bifurcating portion may be adapted to connect the first inflow hole to the first exhaust hole, and is protruded from the surface of the heat radiating portion.

The first inflow hole and the first exhaust hole may be formed at corner portions of the surface of the heat radiating portion facing diagonally with each other.

The second inflow hole and the second exhaust hole may be formed at corner portions of the surface of the heat radiating portion facing diagonally with each other symmetrical to the first inflow hole and the first exhaust hole.

The first operating fluid may be a coolant flowing from a radiator, and the second operating fluid may be a transmission oil flowing from an automatic transmission.

The coolant may circulate through the first inflow hole, the first connecting line, and the first exhaust hole, and the transmission oil may circulate through the second inflow hole, the second connecting line, and the second exhaust hole.

The bifurcating portion may be provided with a bypass line positioned closed to the first inflow hole and the first exhaust hole and adapted to discharge the coolant flowing into the first inflow hole to the first exhaust hole in addition to the first connecting line.

The valve unit may include a mounting member to which a protrude portion, a mounting hole is formed thereto, is integrally formed thereto, fixedly mounted the other portion of the heat radiating portion corresponding to the first inflow hole; a guide rod of which a lower portion is inserted into and fixed to the mounting hole of the mounting member; a moving member of which an upper portion of the guide rod is inserted thereto, of which a deformable material adapted to expand or contract according to temperature of the operating fluid is filled therein, and moving member slidable along the guide rod; an inner case of which an inner surface of an upper surface contacts an upper portion the moving member, movable together with the moving member up and down, and the inner case of which at least one of a first opening hole is formed to a lower portion thereof; an opening/closing member which is disposed between the moving member and the inner case, is elongated or compressed by the inner case movable together with the moving member, and opening/closing member which selectively closes or opens the first opening hole; and an outer case which wraps the inner case, and guides up and down movement of the inner case, and of which at least one bypass hole corresponding to the bifurcating portion is formed to an upper portion thereof, and at least one second opening hole corresponding to the first opening hole is formed to a lower portion thereof, and the outer case which is fixed to an upper portion of the mounting member.

An end of the opening/closing member may be connected to the protrude portion and the other end thereof may be connected to an upper portion of the inner case.

The mounting member may be engaged with the heat radiating portion by screw connection.

The deformable material may be wax material which is expandable or contractable according to temperature of the operating fluid.

At least one guide protrusion may be formed to an exterior circumference of the inner case.

At least one guide slot may be formed to the outer case corresponding to the guide protrusion, and the guide protrusion may be slidable within the guide slot.

The guide protrusion may guide movement of the inner case when the inner case moves upwardly, and prevent the inner case from being separated from the outer case.

At least one penetration hole may be formed to an upper portion of the inner case for the operating fluid flowed into the first inflow hole to flow into the valve unit.

The inner case may be formed cylinder shape of which a lower portion is opened.

The inner case may slide upward within the outer case according to upward movement of the moving member so as to close the bypass hole.

Ring members forming the opening/closing member may be distanced from each other to form a space for the first opening hole to be opened when the moving member moves upward, and the ring members may contact each other for the first opening hole to be closed when the moving member moves downward to an initial position.

The heat exchanger may further include a sealing for preventing the operating fluid flowed into the valve unit from leaking to the exterior, wherein the sealing is mounted between the mounting portion and the outer case.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
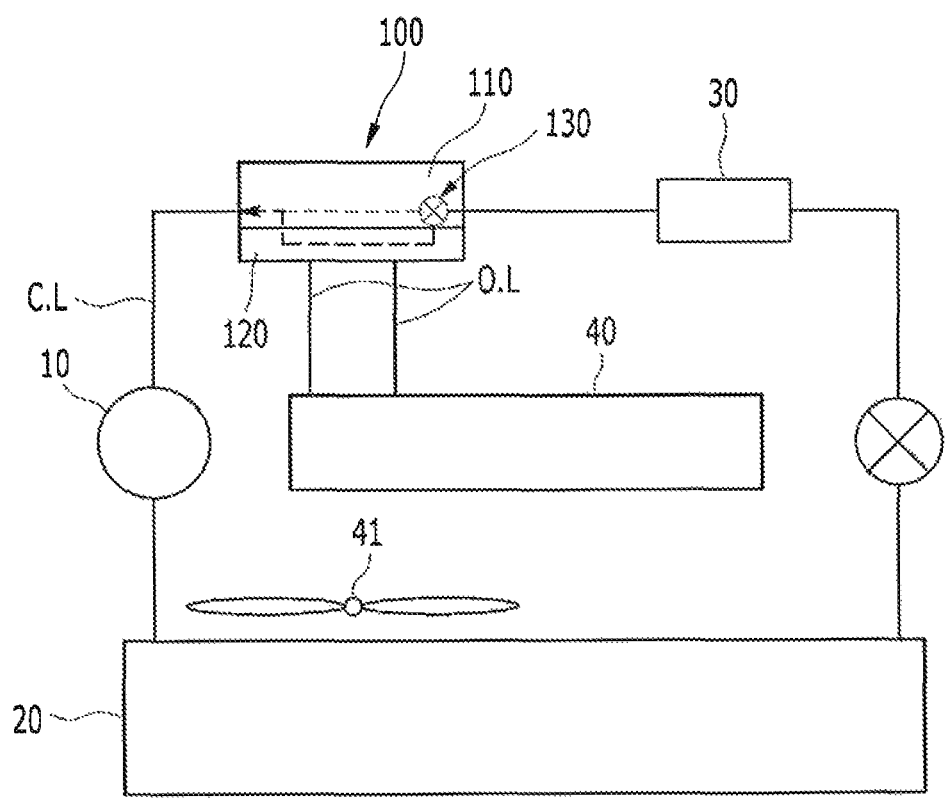
FIG. 1 is a schematic diagram of an exemplary cooling system of an automatic transmission to which heat exchanger for a vehicle according the present invention is applied.
Figure 2:
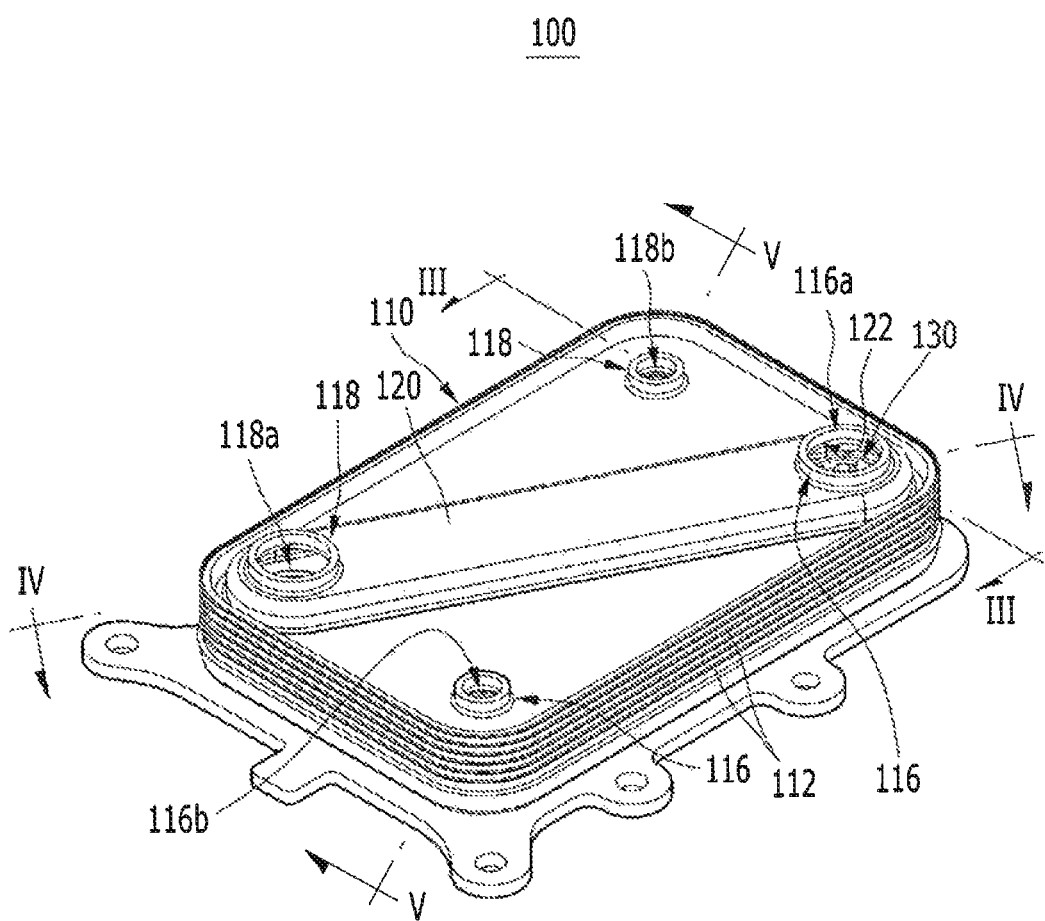
FIG. 2 is a perspective view of an exemplary heat exchanger for a vehicle according to the present invention.
Figure 3:
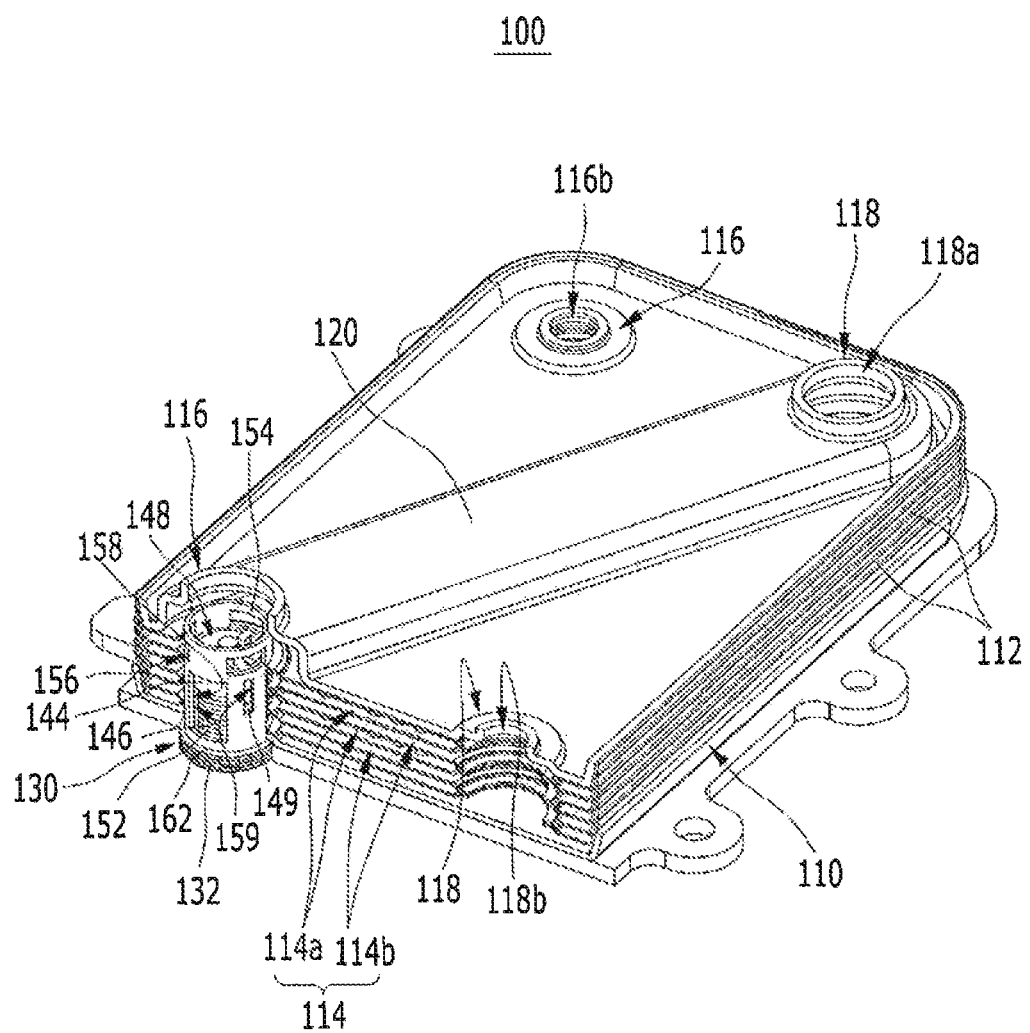
FIG. 3 is a cross-sectional view taken along the line III-III of FIG. 2.
Figure 4:
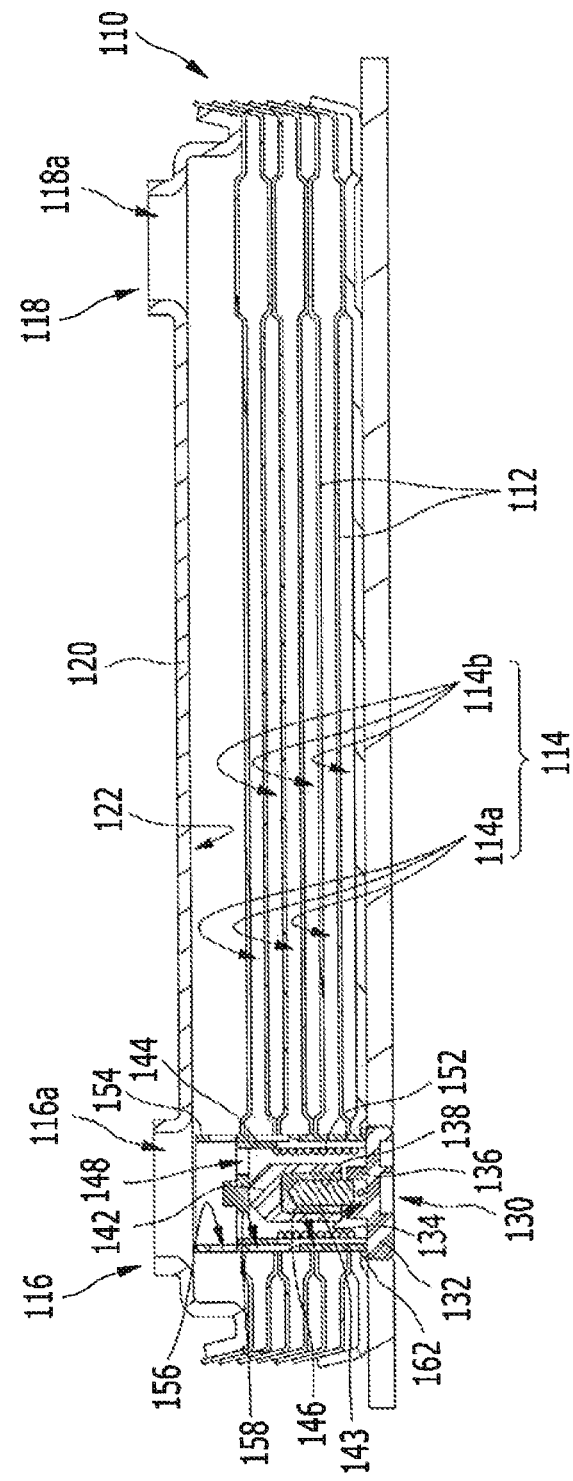
FIG. 4 is a cross-sectional view taken along the line IV-IV of FIG. 2.
Figure 5:
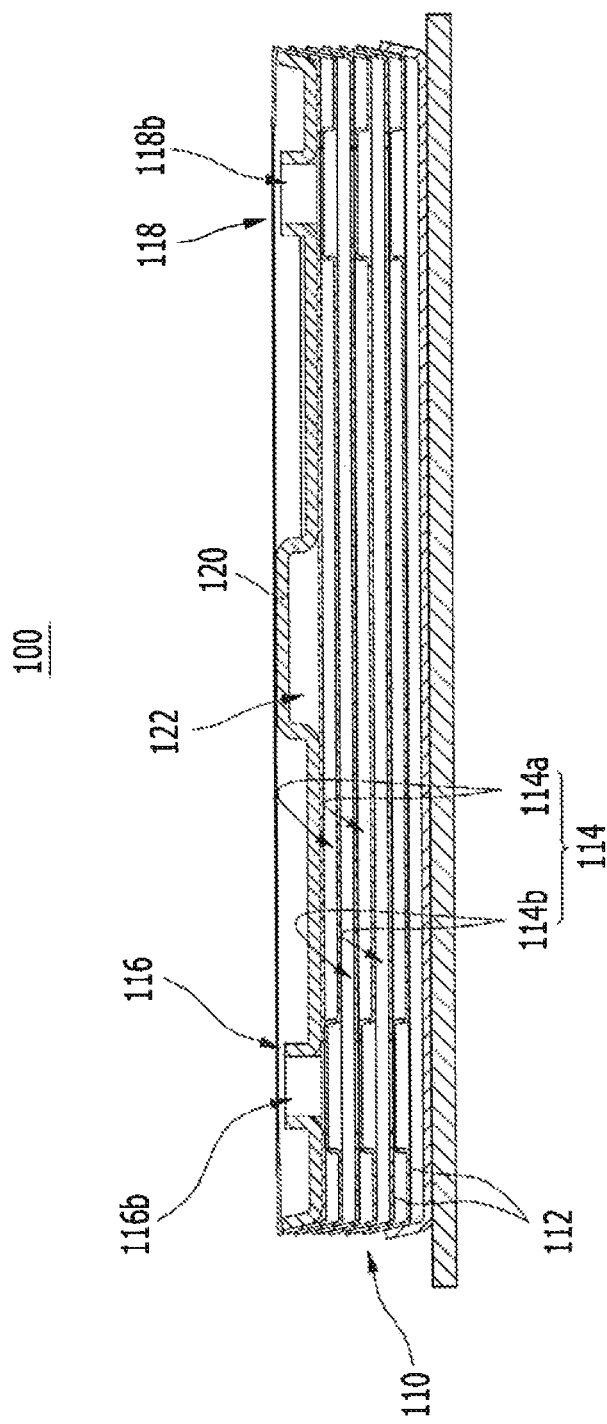
FIG. 5 is a cross-sectional view taken along the line V-V of FIG. 2.
Figure 6:
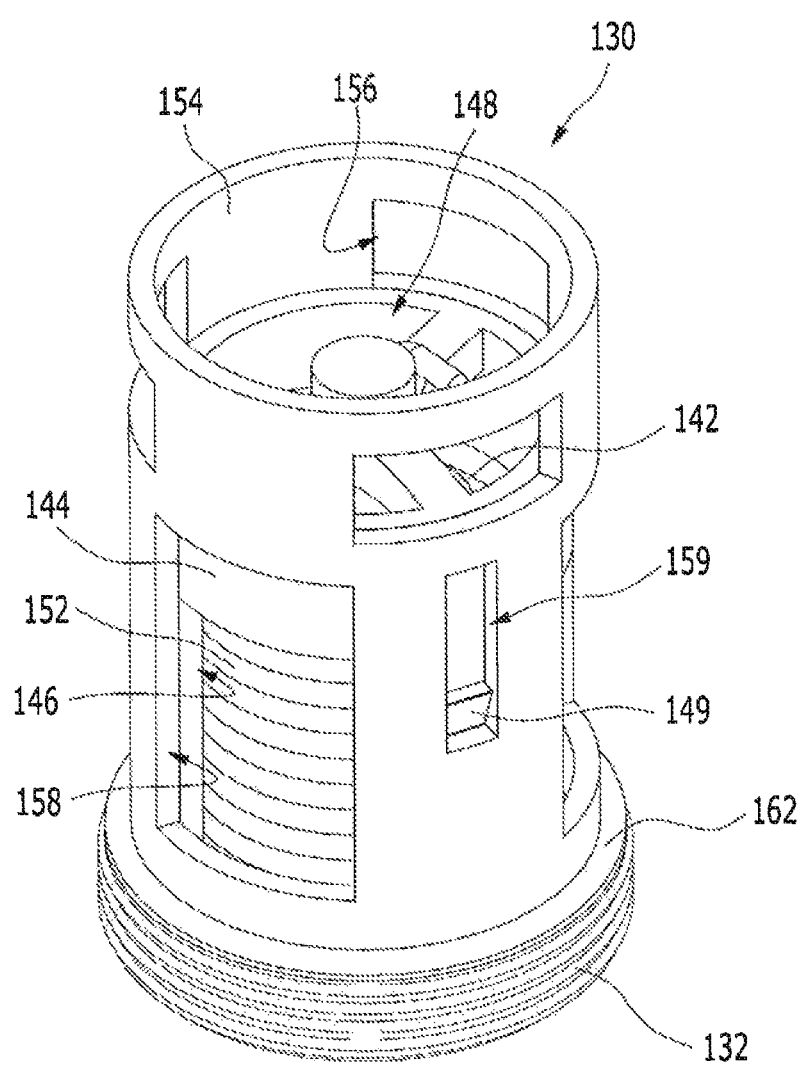
FIG. 6 is a perspective view of a valve unit used in an exemplary heat exchanger for a vehicle according to the present invention.
Figure 7:
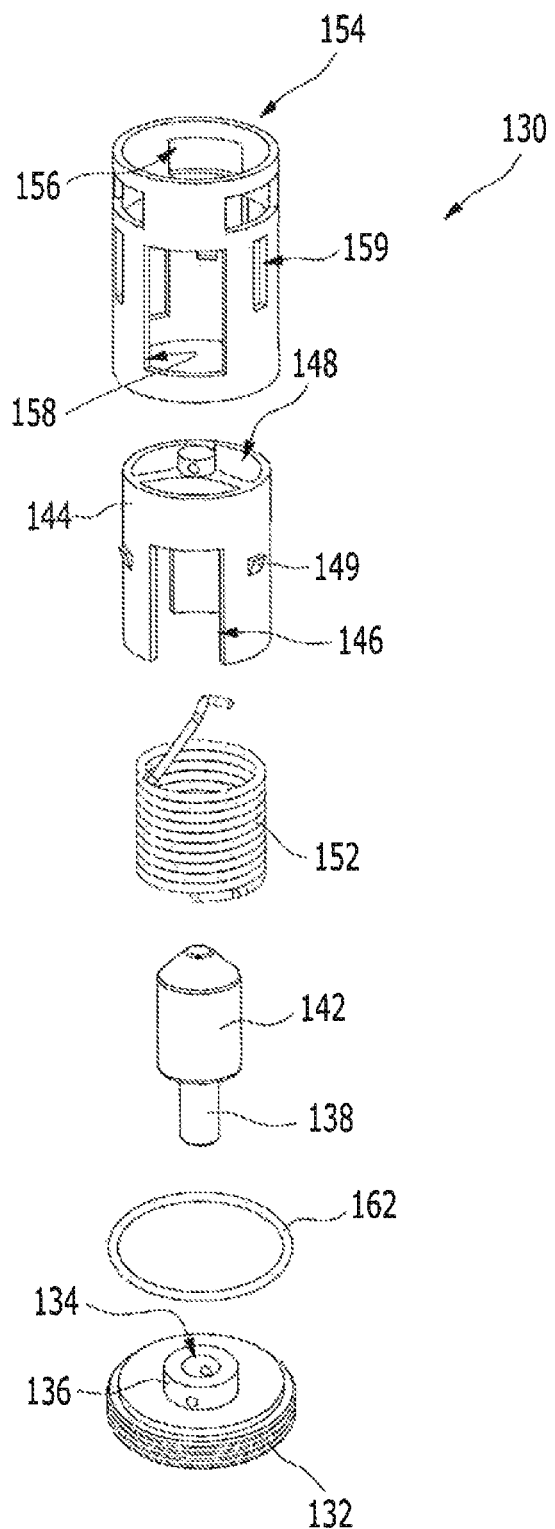
FIG. 7 is an exploded perspective view of an exemplary valve unit according to the present invention.

FIG. 1 is a schematic diagram of a cooling system of an automatic transmission to which a heat exchanger for a vehicle according to various embodiments of the present invention is applied. FIG. 2 is a perspective view of a heat exchanger for a vehicle according to various embodiments of the present invention, FIG. 3 is a cross-sectional view taken along the line III-III, FIG. 4 is a cross-sectional view taken along the line IV-IV, and FIG. 5 is a cross-sectional view taken along the line V-V. FIG. 6 is a perspective view of a valve unit used in a heat exchanger for a vehicle according to various embodiments of the present invention, and FIG. 7 is an exploded perspective view of a valve unit according to various embodiments of the present invention.

Referring to the drawings, a heat exchanger 100 for a vehicle according to various embodiments of the present invention applies to a cooling system of an automatic transmission for a vehicle.

The cooling system of the automatic transmission, as shown in FIG. 1, is provided with a cooling line CL for cooling an engine. A coolant passes through the radiator 20 having a cooling fan 21 through a water pump 10 and is cooled by the radiator 20. A heater core 30 connected to a heating system of the vehicle is mounted at the cooling line CL.

A heat exchanger 100 for a vehicle according to various embodiments of the present invention warms up or cools operating fluids according to temperatures or flow amounts of the operating fluids flowing in at a running state or an initial starting condition of the vehicle when the temperatures of the operating fluids are controlled in the heat exchanger 100 through heat exchange.

For this purpose, the heat exchanger 100 for a vehicle according to various embodiments of the present invention is disposed between the water pump 10 and the heater core 30, and is connected to an automatic transmission 40 through first and second oil lines OL1 and OL2.

That is, the operating fluids include a coolant flowing from the radiator 20, a transmission oil flowing from the automatic transmission 40 according to various embodiments. The heat exchanger 100 causes transmission oil to exchange heat with the coolant such that a temperature of the transmission oil is controlled.

The heat exchanger 100 according to various embodiments of the present invention, as shown in FIG. 2 and FIG. 3, includes a heat radiating portion 110, a bifurcating portion 120 and a valve unit 130, and each constituent element will be described in detail.

The heat radiating portion 110 is formed by stacking a plurality of plates 112, and a plurality of connecting lines 114 is formed between the neighboring plates 112. The coolant flows through a part of the connecting lines 114 among the plurality of connecting lines 114, and the transmission oil flows through another part of the connecting lines 114 among the plurality of connecting lines 114. Another part of the connecting lines 114 through which the transmission oil flows are disposed between the part of connecting lines 114 and are separated. At this time, the coolant exchanges heat with the transmission oil.

In addition, the operating fluid supplied to the connecting line 114 is not mixed with other operating fluid supplied to other connecting line 114.

Herein, the heat radiating portion 110 causes the coolant to exchange heat with the transmission oil by counterflow of the coolant and the transmission oil.

The heat radiating portion 110 is a heat radiating portion of plate type (or disk type) where the plurality of plates 112 is stacked.

In addition, the bifurcating portion 120 connects one of inflow holes 116 for flowing the operating fluids into the heat radiating portion 110 with one of exhaust holes 118 for discharging the operating fluids from the heat radiating portion 110.

The bifurcating portion 120 is configured for the operating fluid to detour by the valve unit 130 operated according to the temperature of the operating fluid.

The inflow holes 116 include first and second inflow holes 116a and 116b formed at both sides of a surface of the heat radiating portion 110 along a length direction according to various embodiments.

In addition, the exhaust hole 118 includes first and second exhaust holes 118a and 118b formed at the both sides of the surface of the heat radiating portion 110 along the length direction. The first and second exhaust holes 118a and 118b correspond to the first and second inflow holes 116a and 116b and are distanced from the first and second inflow holes 116a and 116b.

The first and second exhaust holes 118a and 118b are connected respectively to the first and second inflow holes 116a and 116b through the respective connecting line 114 in the heat radiating portion 110.

The first inflow hole 116a and the first exhaust hole 118a are formed at corner portions of the surface of the heat radiating portion 110 diagonally.

The second inflow hole 116b and the second exhaust hole 118b are formed at corner portions of the surface of the heat radiating portion 110 facing diagonally with each other symmetrical to the first inflow hole 116a and the first exhaust hole 118b.

The bifurcating portion 120 connects the first inflow hole 116a with the first exhaust hole 118a, and is protruded from the surface of the heat radiating portion 110.

According to various embodiments, the coolant circulates through the first inflow hole 116a and the first exhaust hole 118a, and the transmission oil circulates through the second inflow hole 116b and the second exhaust hole 118b.

Connecting ports may be mounted respectively at the first and second inflow holes 116a and 116b and the first and second exhaust holes 118a and 118b, and are connected to the radiator 20 and the automatic transmission 40 through connecting hoses connected to the connecting ports.

According to various embodiments, the connecting line 114, as shown in FIG. 4 and FIG. 5, includes first and second connecting lines 114a and 114b, and will be described in detail.

Herein, the bifurcating portion 120 includes a bypass line 122 formed at a position close to the first inflow hole 116a and the first exhaust hole 118b. The bypass line 122 is adapted to exhaust the coolant flowing into the first inflow hole 116a directly to the first exhaust hole 118a, not passing through the first connecting line 114a.

In addition, the valve unit 130 is mounted at the heat radiating portion 110 corresponding to the first inflow hole 116a, and flows the coolant to the heat radiating portion 110 or to the bypass line 122 according to the temperature of the coolant.

The valve unit 130, as shown in FIG. 6 and FIG. 7, includes a mounting member 132, a guide rod 138, a moving member 142, an inner case 144, an opening/closing member 152, and an outer case 154, and will be described in detail.

A protrude portion 136, a mounting hole 134 is formed thereto, is integrally and/or monolithically formed with the mounting member 132, and the mounting member 132 is fixedly mounted the other portion of the heat radiating portion 10 corresponding to the first inflow hole 116a.

A screw is formed at an exterior circumference of the mounting member 132 such that the mounting member 132 is engaged with an interior circumference of the heat radiating portion 110.

A lower portion of the guide rod 138 is inserted into and fixed to the mounting hole 134 of the mounting member 132.

An upper portion of the guide rod 138 is inserted to the moving member 142, and a deformable material 143 adapted to expand or contract according to temperature of the operating fluid is filled within the moving member 142, and the moving member 142 is slidable along the guide rod 138.

The moving member 142 is provided with the deformable material (143; referring to FIG. 4, 9 and FIG. 10) filled therewithin, and the deformable material 143 is a material which may be expanded or contracted according to the temperature of the operating fluid, for example wax material.

The volume of the wax material may be expanded or contracted according to the temperature, for example, if the temperature is raised, the volume is expanded. On the contrary, if the temperature is lowered, the volume is contracted to the initial volume.

If the coolant with relatively high temperature flows into the first inlet 116a, the moving member 142 moves upward from the initial position along the guide rod 138 by expansion of the deformable material 143 filled therein.

On the contrary, if the coolant with relatively low temperature flows into the first inlet 116a, the moving member 142 moves downward to the initial position along the guide rod 138 by contraction of the deformable material 143 filled therein.

If the coolant with relatively low temperature flows into the first inlet 116a at the initial position, the moving member 142 positions at the initial position because the deformable material 143 may not be expanded nor contracted.

In various embodiments, an inner surface of an upper surface of the inner case 144 contacts an upper portion the moving member 142.

So, the inner case 144 is movable together with the moving member 142 up and down, and at least one of a first opening hole 146 is formed to a lower portion of the inner case 144.

The inner case 144 is formed cylinder shape of which a lower portion is opened, and at least one penetration hole 148 is formed to an upper portion of the inner case 144 for the operating fluid flowing through the first inflow hole 116a to contact the moving member 142.

In the drawings, while 3 penetration holes 148 are formed to the upper portion of the inner case 144 apart from each other, but it is not limited thereto.

In the drawings, while 3 first opening holes 146 are formed to the exterior circumference of the inner case 144 at 120°, but it is not limited thereto.

The first opening hole 146 selectively allows the coolant, flowed through the penetration hole 148 to flow to the first connecting line 114a.

The opening/closing member 152 is disposed between the moving member 142 and the inner case 144, is elongated or compressed by up or down movement of the inner case 144 moving together with the moving member 142.

The opening/closing member 152 selectively opens the first opening hole 146 according to elongation or compression thereof, and supplying biasing force to the inner case 144.

One end of the opening/closing member 152 is connected to the protrude portion. 136, and the other end thereof is connected to an upper portion of the inner case 144.

When the moving member 142 moves upward along the guide rod 138, the opening/closing member 152 is elongated by the inner case 144 so as to open the first opening hole 146.

On the contrary, when the moving member 142 returns to the initial position, the opening/closing member 152 is contracted as the initial state so as to close the first opening hole 146.

In various embodiments, the outer case 154 wraps the inner case 144, and guides the movement of the inner case 144.

At least one bypass hole 156 is formed to the upper portion of the outer case 154 corresponding to the bifurcating portion 120, at least one the second opening hole 158 corresponding to the first opening hole 146 is formed to the lower portion of the outer case 154, and the outer case 154 is fixed to the mounting member 132.

In the drawings, the bypass hole 156 and the second opening hole 158 are formed apart from each other at different angled, but it is not limited thereto.

The second opening hole 158 is formed to the lower portion of the outer case 154.

In the drawings, three bypass holes 156 are formed to the exterior circumference of the upper portion of the outer case 154 at 120° from each other, but it is not limited thereto.

When the moving member 142 moves upward, the upper portion of the inner case 144 slides upward within the outer case 154 and closes the bypass hole 156.

At least one guide protrusion 149 is formed to the exterior circumference of the inner case 144.

At least one guide slot 159 corresponding to the guide protrusion 146 is formed to the outer case 154, and the guide protrusion 146 is slideable within the guide slot 159.

The guide protrusion 149 moves within the guide slot 159 when the inner case 144 moves up and down, guides the movement of the inner case 144, and prevents the inner case 144 from being separated from the outer case 154.

In the drawings, 3 guide protrusions 149 and 3 guide slots 159 are formed at 120° from each other, but it is not limited thereto. On the contrary, numbers and positions of the guide protrusion 149 and the guide slot 159 may be various.

A sealing 162 is disposed between the mounting member 132 and the outer case 154 for sealing the operating fluid.

That is, the sealing 162 seals a gap between the mounting member 132 and the outer case 154 such that the operating fluid is prevented from being leaked to the exterior of the heat radiating portion 110 along the mounting member 132 and the heat radiating portion 110.

The outer case 154 is positioned to the mounting member 132 for the second opening hole 158 to correspond to the first opening hole 146.

Before the valve unit 130 is operated, the lower end of the inner case 144 contacts the mounting member 132 by elastic force of the opening/closing member 152, and the bypass hole 156 is opened.

Figure 8:
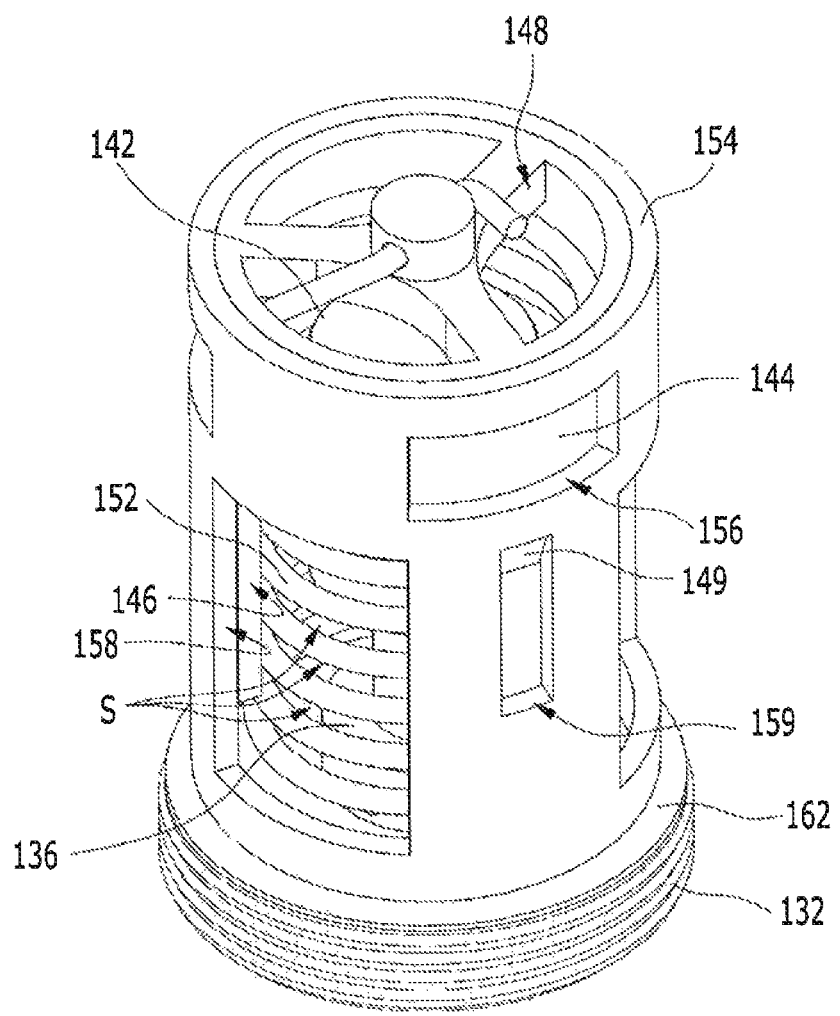
FIG. 8 is a drawing for describing operation of an exemplary valve unit for a heat exchanger according to the present invention.

As shown in FIG. 8, the operation fluid flowed through the first inflow hole 116a flows into the inner case 144 through the penetration hole 148.

When the temperature of the operating fluid is higher than a predetermined temperature, the deformable material 143 within the moving member 144 is expanded so that the moving member 144 moves upward on the guide rod 138.

Also, the inner case 144 moves upward together with the moving member 142 within the outer case 152.

Since each guide protrusion 149 of the inner case 144 slides along the guide slot 159 so that the movement of the inner case 144 is stable.

In this case, the bypass hole 158 is closed by the inner case 144, the ring members forming the opening/closing member 152 are apart from each other to form a space S, and the operating fluid flows into the first connecting line 114a through the first and second opening holes 146 and 158.

If the temperature of the operating fluid is lower than a predetermined temperature, the moving member 142 moves downward on the guide rod 138 as shown in FIG. 6.

In this case, the opening/closing member 152 is compressed by its elastic force, the inner case 144 also moves downward by the elastic force. And thus the bypass hole 156 is opened simultaneously, the ring members forming the opening/closing member 152 contact each other to close the first and second opening holes 152 and 158.

Operation and function of the heat exchanger 100 according to various embodiments of the present invention will be described in detail.

Figure 9:
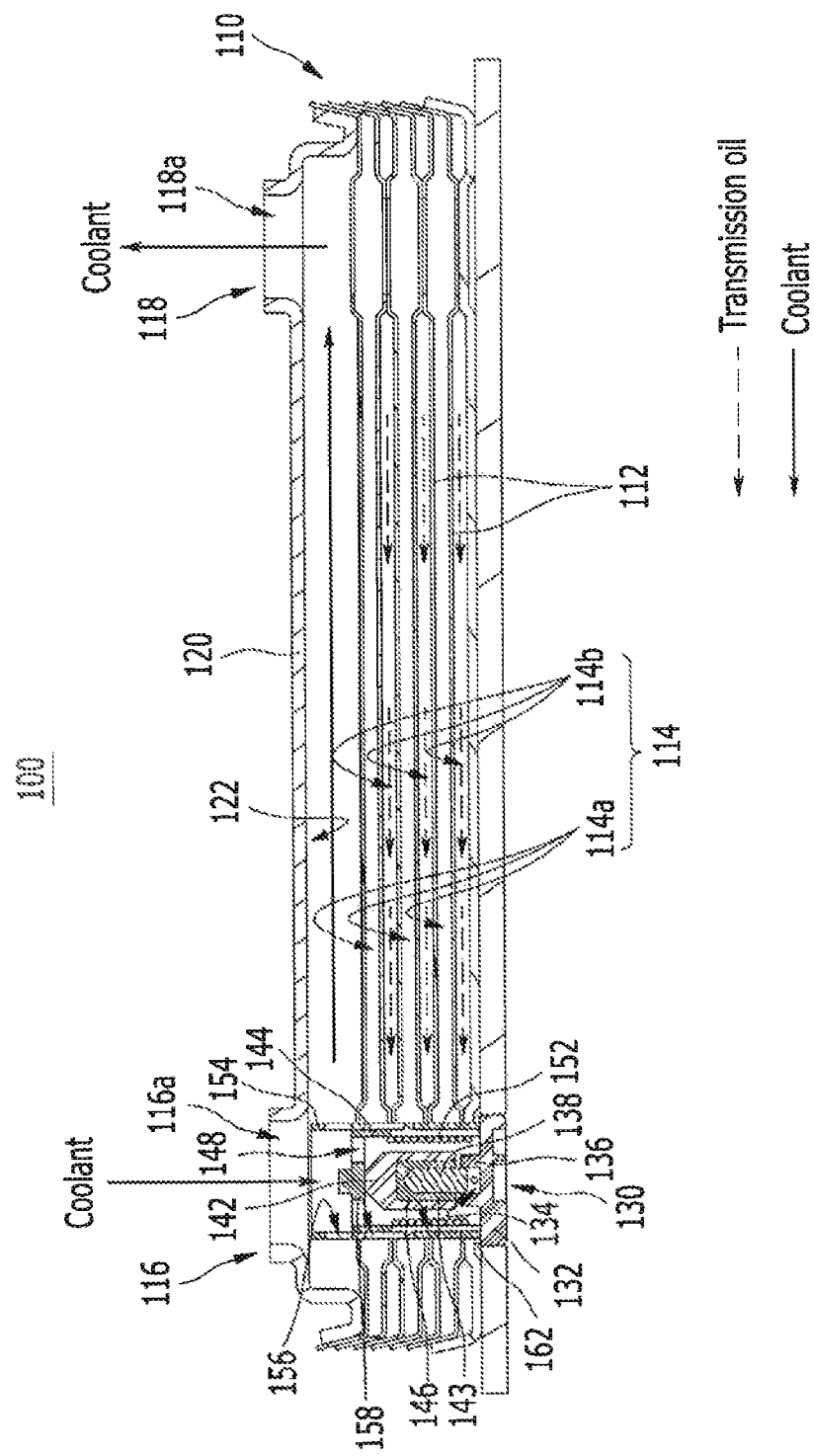
FIG. 9 to FIG. 10 are drawings for describing operation of exemplary heat exchangers for a vehicle according to the present invention.
Figure 10:
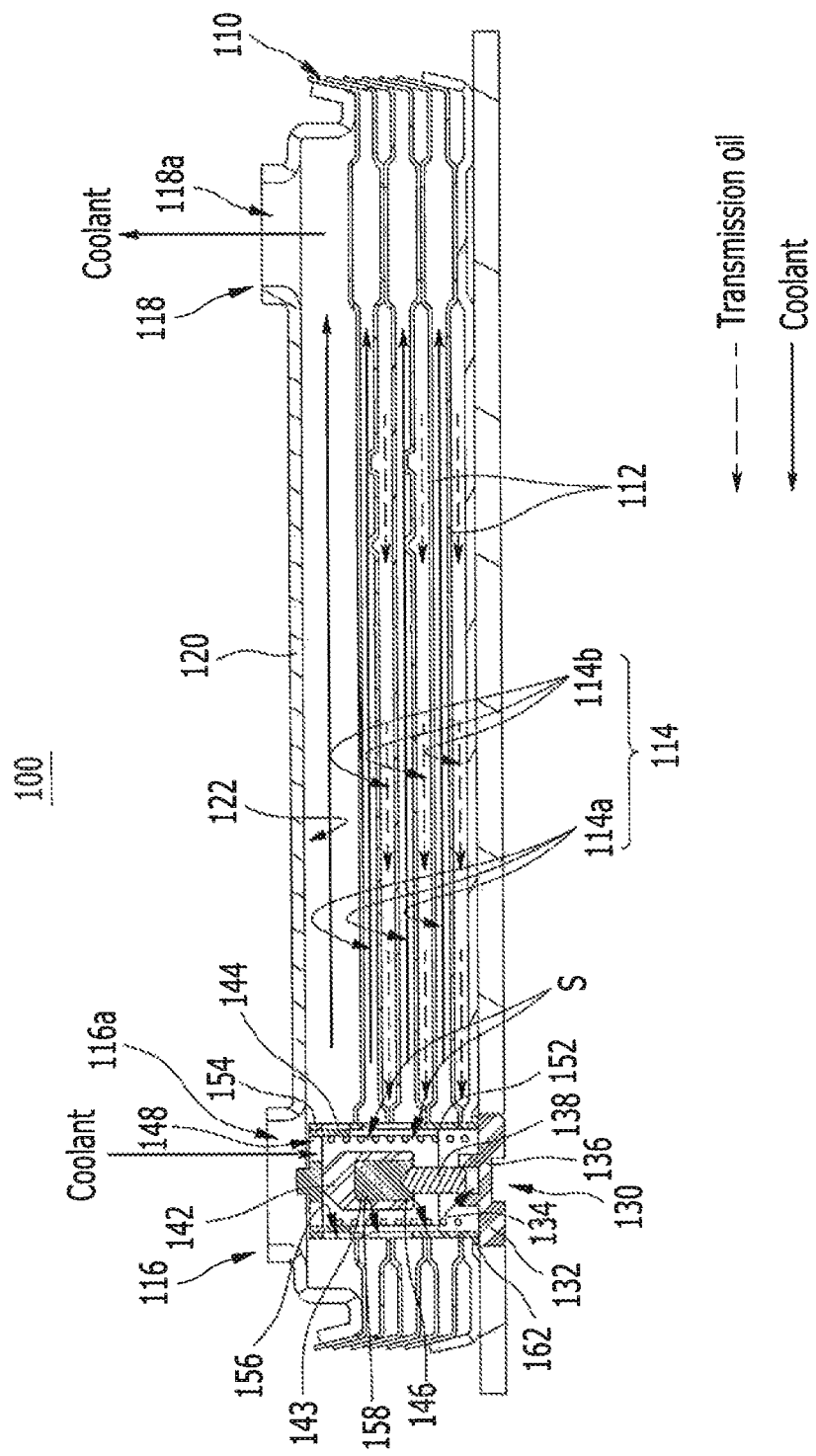

FIG. 9 to FIG. 10 FIG. 8 are drawings for describing operation of a heat exchanger for a vehicle according to various embodiments of the present invention.

If the temperature of the operating fluid flowed through the first inflow hole 116a is lower than a predetermined temperature, the moving member 142 maintains its initial position as shown in FIG. 9.

Also, the inner case 144 also maintains the initial position as shown in FIG. 6, and the bypass hole 156 of the outer case 154 is opened.

As described above, the first opening hole 146 and the second opening hole 158 are closed by the opening/closing member 152 so that the coolant flowed into the valve unit 130 may not flows into the first connecting line 114a.

The flowed coolant is exhausted through the bypass hole 156 out of the valve unit 130. So the coolant does not flow though the first connecting line 114a of the heat radiating portion 110 but flows directly to the first exhaust hole 118a though the bypass line 122 formed by the bifurcating portion 120.

Accordingly, the coolant does not flow into the first connecting line 114a of the heat radiating portion 110. So the coolant does not exchange heat with the transmission oil flowed through the second inflow hole 116b and the second connecting line 114b of the heat radiating portion 110.

If the transmission oil should be warmed up according to a condition or a mode of the vehicle such as a running state, an idle mode, or an initial starting, the bypass line 122 prevents the coolant of low temperature from flowing into the first connecting line 114a. Therefore, it is prevented that the temperatures of the transmission oil is lowered through heat exchange with the coolant.

If the temperature of the coolant, on the contrary, is higher than the predetermined temperature, the moving member 142 of the valve unit 130 moves upward on the guide rod 138 as shown in FIG. 10. So the inner case 144 within the outer case 154 also moves upward.

Thus the upper portion of the inner case 144 closes the bypass hole 156 as shown in FIG. 8, and the opening/closing member 152 forms spaces S.

Thus, the first and second opening holes 146 and 158 is opened through the inner case 144 and the space S formed by the opening/closing member 152.

The coolant flowed into the valve unit 130 is exhausted though the space S, the first and second opening holes 146 and 158, the first connecting line 114a, and the first exhaust hole 118a passing through the heat radiating portion 110.

Meanwhile, a part of the coolant flowed into the first inflow hole 116a does not flow into the valve unit 130, but flows though the bypass line 122, and then is exhausted through the first exhaust hole 118a with the coolant passing through the first connecting line 114a.

A part of the coolant passing through the first connecting line 114a of the heat radiating portion 110 and the transmission oil passing through the second inflow hole 115b and the second connecting line 114b exchange heat within the heat radiating portion 110 so that the temperatures thereof may be controlled.

The coolant and the transmission oil flows different direction or opposition direction and exchange heat with each other because the first and second inflow hole 116a and 116b are formed to the corners of the heat radiating portion 110 in diagonal direction. Therefore, the transmission oil and the engine oil exchange heat with the coolant more efficiently.

Therefore, the transmission oil, the temperatures of which is raised by operation of a torque converter, is cooled through heat exchange with the coolant in the heat radiating portion 110 and is then supplied to the automatic transmission 40.

That is, since the heat exchanger 100 supplies the cooled transmission oil to the automatic transmission 40 rotating with a high speed, occurrence of slip in the automatic transmission 40 is prevented.

If the heat exchanger 100 according to various embodiments of the present invention is applied, the operating fluids can be warmed up and cooled simultaneously by using the temperatures of the operating fluids at the running state or the initial starting condition of the vehicle. Therefore, the temperatures of the operating fluids can be controlled efficiently.

The moving member 142 filled with the deformable material 143 such as the wax material which may be expanded or contracted according to the flowed operating fluid may selectively supplies the coolant to the bifurcating portion 120 or the heat radiating portion 110. Therefore, constituent elements can be simplified and production cost may be curtailed. In addition, weight may be reduced.

Since additional bifurcation circuits are not needed, production cost may be curtailed, workability and utilization of space in a small engine compartment may be improved, and a layout of connecting hoses may be simplified.

If the operating fluid is the transmission oil in the automatic transmission 40, hydraulic friction at a cold starting may be lowered due to fast warm up. In addition, slip may be prevented and durability may be maintained at driving due to excellent cooling performance. Therefore, fuel economy and durability of the transmission may be improved.

It is exemplified in this specification that the coolant and the transmission oil is used as the operating fluids, but the operating fluids are not limited to these. All the operating fluids that require warming up or cooling can be used.

In addition, the heat exchanger according to various embodiments may further include covers and brackets that prevent damage of the heat exchanger and other components or that are used for fixing the heat exchanger to other components or the engine compartment.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heat exchanger for a vehicle, comprising:
a heat radiating portion provided with a first connecting line and a second connecting line formed alternately by stacking a plurality of plates, and receiving first and second operating fluids into the first and second connecting lines, respectively, the first and second operating fluids heat-exchanging with each other while passing through the first and second connecting lines, wherein the first and second operating fluids supplied to the first and second connecting lines, respectively, are not mixed with each other while circulated;
a bifurcating portion connecting an inflow hole for flowing one operating fluid of the first and second operating fluids with an exhaust hole for exhausting the one operating fluid, and adapted for the one operating fluid to bypass the heat radiating portion according to a temperature of the one operating fluid; and
a valve unit mounted at the inflow hole forming the bifurcating portion and adapted to flow the one operating fluid selectively to the heat radiating portion or the bifurcating portion according to a temperature of the one operating fluid flowing into the inflow hole,
wherein the first operating fluid flows into the heat radiating portion through a first inflow hole and flows out from the heat radiating portion through a first exhaust hole, and the first inflow hole is connected to the first exhaust hole through the first connecting line,
wherein the second operating fluid flows into the heat radiating portion through a second inflow hole and flows out from the heat radiating portion through a second exhaust hole, and the second inflow hole is connected to the second exhaust hole through the second connecting line, wherein the first and second inflow holes are formed at both sides of a surface of the heat radiating portion along a length direction, wherein the first and second exhaust holes are distanced from the first and second inflow holes and are formed at the both sides of the surface of the heat radiating portion along the length direction, and wherein the valve unit comprises:
- a mounting member to which a protrude portion, a mounting hole is formed thereto, is integrally formed thereto, fixedly mounted a portion of the heat radiating portion corresponding to the first inflow hole;
- a guide rod of which a lower portion is inserted into and fixed to the mounting hole of the mounting member;
- a moving member of which an upper portion of the guide rod is inserted thereto, of which a deformable material adapted to expand or contract according to temperature of the operating fluid is filled therein, and moving member slidable along the guide rod;
- an inner case of which an inner surface of an upper surface contacts an upper portion the moving member, movable together with the moving member up and down, and the inner case of which at least one of a first opening hole is formed to a lower portion thereof;
- an opening/closing member which is disposed between the moving member and the inner case, is elongated or compressed by the inner case movable together with the moving member, and opening/closing member which selectively closes or opens the first opening hole; and
- an outer case which wraps the inner case, and guides up and down movement of the inner case, and of which at least one bypass hole corresponding to the bifurcating portion is formed to an upper portion thereof, and at least one second opening hole corresponding to the first opening hole is formed to a lower portion thereof, and the outer case which is fixed to an upper portion of the mounting member.

2. The heat exchanger of claim 1, wherein the bifurcating portion is adapted to connect the first inflow hole to the first exhaust hole, and is protruded from the surface of the heat radiating portion.

3. The heat exchanger of claim 1, wherein the first inflow hole and the first exhaust hole are formed at corner portions of the surface of the heat radiating portion facing diagonally with each other.

4. The heat exchanger of claim 1, wherein the second inflow hole and the second exhaust hole are formed at corner portions of the surface of the heat radiating portion facing diagonally with each other symmetrical to the first inflow hole and the first exhaust hole.

5. The heat exchanger of claim 1, wherein the first operating fluid is a coolant flowing from a radiator, and the second operating fluid is a transmission oil flowing from an automatic transmission.

6. The heat exchanger of claim 5, wherein the coolant circulates through the first inflow hole, the first connecting line, and the first exhaust hole, and the transmission oil circulates through the second inflow hole, the second connecting line, and the second exhaust hole.

7. The heat exchanger of claim 6, wherein the bifurcating portion is provided with a bypass line positioned closed to the first inflow hole and the first exhaust hole and adapted to discharge the coolant flowing into the first inflow hole to the first exhaust hole in addition to the first connecting line.

8. The heat exchanger of claim 1, wherein an end of the opening/closing member is connected to the protrude portion and another end thereof is connected to an upper portion of the inner case.

9. The heat exchanger of claim 1, wherein the mounting member is engaged with the heat radiating portion by screw connection.

10. The heat exchanger of claim 1, wherein the deformable material is wax material which is expandable or contractable according to temperature of the operating fluid.

11. The heat exchanger of claim 1, wherein at least one guide protrusion is formed to an exterior circumference of the inner case.

12. The heat exchanger of claim 11, wherein at least one guide slot is formed to the outer case corresponding to the guide protrusion, and
the guide protrusion is slidable within the guide slot.

13. The heat exchanger of claim 12, wherein the guide protrusion guides movement of the inner case when the inner case moves upward, and prevents the inner case from being separated from the outer case.

14. The heat exchanger of claim 1, wherein at least one penetration hole is formed to an upper portion of the inner case for the operating fluid flowed into the first inflow hole to flow into the valve unit.

15. The heat exchanger of claim 1, wherein the inner case is formed in a cylinder shape of which a lower portion is opened.

16. The heat exchanger of claim 1, wherein the inner case slides upward within the outer case according to upward movement of the moving member so as to close the bypass hole.

17. The heat exchanger of claim 1, wherein:
ring members forming the opening/closing member are distanced from each other to form a space for the first opening hole to be opened when the moving member moves upward, and
the ring members contact each other for the first opening hole to be closed when the moving member moves downward to an initial position.

18. The heat exchanger of claim 1, further comprising a sealing for preventing the operating fluid flowed into the valve unit from leaking to an exterior,
wherein the sealing is mounted between the mounting portion and the outer case.

* * * * *

UNITED STATES PATENT AND TRADEMARK OFFICE
CERTIFICATE OF CORRECTION

| | |
|---|---|
| PATENT NO. | : 9,255,748 B2 |
| APPLICATION NO. | : 13/714215 |
| DATED | : February 9, 2016 |
| INVENTOR(S) | : Wan Je Cho et al. |

It is certified that error appears in the above-identified patent and that said Letters Patent is hereby corrected as shown below:

On the title page, in item (71) Applicant, after "Hyundai Motor Company, Seoul (KR)" please insert:
--KBAUTOTECH CO., LTD., Asan-si (KR)--.

Signed and Sealed this
Third Day of May, 2016

Michelle K. Lee
*Director of the United States Patent and Trademark Office*